United States Patent Office 2,968,903
Patented Jan. 24, 1961

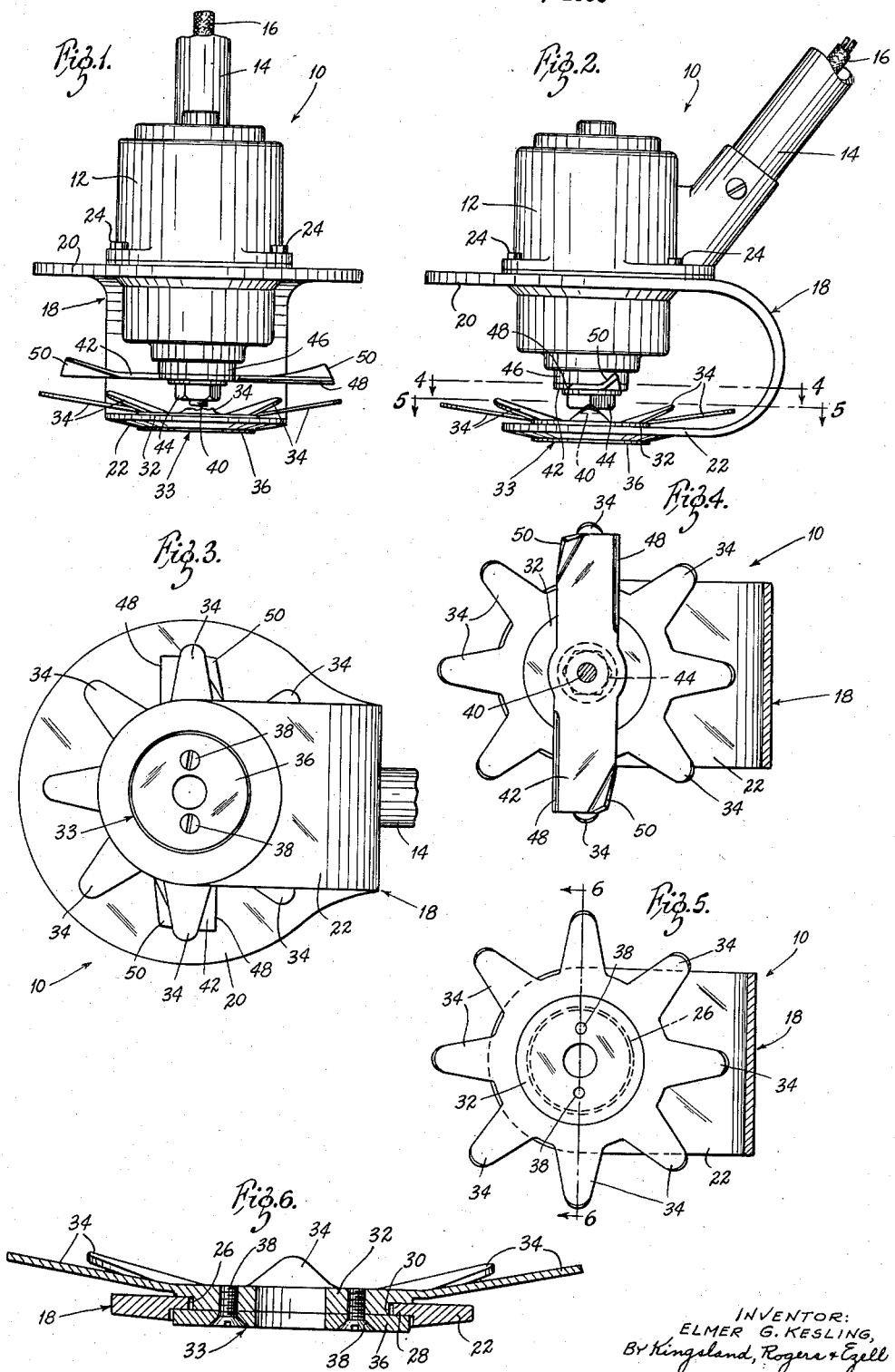

2,968,903

LAWN EDGE TRIMMER

Elmer G. Kesling, 5 Scarsdale Lane,
Richmond Heights 17, Mo.

Filed Dec. 4, 1958, Ser. No. 778,168

7 Claims. (Cl. 56—25.4)

The present invention relates generally to powered lawn edge trimmers, and more particularly to a novel guard and grass lifter unit therefor.

There has long existed the need for an efficient lawn edge trimmer for continuously consecutively lifting grass, or the like, for cutting by a driven rotary blade. Heretofore, there have been devised various stationary grass lifting guard plates of different forms, but until the present invention no one conceived a freely rotatable combination guard and grass lifter plate having radial projections which engage the grass and are turned thereby to place the next projection in position for engaging and lifting grass to be cut as the trimmer is moved along by the user in a continuous action.

In brief, the present novel device comprises a freely rotating star-like plate unit mounted on the lower arm of a U-shaped bracket beneath a power driven rotary blade secured to the shaft of an electric motor. The upper arm of the bracket is secured to the housing of the electric motor. A long handle for manipulation of the trimmer is connected to the electric motor housing. As the trimmer is moved along the edge of a walk, the engaged grass causes the pointed plate to turn and in so doing lift the grass which is cut off by the rotating blade.

An object of the present invention is to provide a novel guard and grass lifting unit for the powered rotary blade of a lawn edge trimmer which is highly effective in protecting the blade and in lifting grass for severance thereby.

Another object is to provide a novel guard and grass lifting unit for the powered rotary blade of a lawn edge trimmer which is freely rotatable in respect to the trimmer and the blade and incorporates a plurality of projecting points for lifting grass.

Another object is to provide a novel guard and grass lifting unit for the powered rotary blade of a lawn edge trimmer which is freely rotatable in respect to the trimmer and the blade which reduces clogging to a minimum.

Another object is to provide a trimmer having a novel guard and grass lifting unit which is freely rotatable in respect to the trimmer and which is formed to pick up close growing grass or other foliage for cutting as the trimmer is moved diagonally across the edge of a walk.

Another object is to provide a novel guard and grass lifting unit for the powered rotary blade of a lawn edge trimmer which is freely rotatable in respect to the trimmer and which is formed to pick up close growing grass and other foliage for cutting and to throw cut grass from the trimmer.

Another object is to provide a radial powered guard and grass lifter unit mounted for free rotation for continuously engaging and raising grass as the trimmer is moved back and forth diagonally along the edge of a walk.

Another object is to provide a novel guard and grass lifting unit for a powered lawn edge trimmer which is mounted on the lower arm of a bracket connected to a motor housing which extends forwardly below a power driven cutting blade, said guard being mounted for free rotary movement.

Another object is to provide a novel guard unit for the powered rotary blade of a lawn edge trimmer which is freely rotatable in respect to the trimmer and blade, which is easy to manipulate, which can be used with minimum instruction, which is relatively inexpensive, and which otherwise fulfills the objects and advantages sought therefor.

The foregoing and other objects and advantages are apparent from the following description taken with the accompanying drawing, in which:

Figure 1 is a front elevational view of a lawn edge trimmer incorporating the present novel guard unit, the handle being broken away for conservation of space;

Figure 2 is a side elevational view thereof;

Figure 3 is a bottom plan view thereof;

Figure 4 is a horizontal cross-sectional view taken on substantially the line 4—4 of Figure 2;

Figure 5 is a horizontal cross-sectional view taken on substantially the line 5—5 of Figure 2; and Figure 6 is an enlarged vertical cross-sectional view taken on substantially the line 6—6 of Figure 5.

Referring to the drawing more particularly by reference numerals, 10 indicates generally a power lawn edge trimmer, which includes a motor housing 12 having a handle 14 of conventional type secured thereto through which an electric cord 16 runs.

A U-shaped bracket 18 including an upper arm 20 and a lower arm 22 is secured to the motor housing 12 by bolts 24. The lower arm 22 has an annular opening 26 surrounded by an annular shoulder 28 (Fig. 6). Resting in the opening 26 is the disc-shaped flange 30 of a blade guard and grass lifting plate 32 of a blade guard and grass lifting unit 33 which includes a plurality of radially projecting upwardly curved points 34 extending beyond the lower arm 22. A disc 36 is disposed against the annular shoulder 28 and is secured to the plate 32 by screws 38. The depth of the disc-shaped flange 30 is a little greater than the thickness of the lower arm 22 at the opening 26, so that the plate 32 is freely rotatable.

Within the motor housing 12 is a conventional electric motor (not shown) to the rotor of which is secured a shaft 40. A rotary grass cutting blade 42 is secured to the shaft 40 by a nut 44, being forced thereby against a member 46 rotatable with the shaft 40. The blade 42 has sharpened leading edge portions 48 and upwardly turned trailing edge portions 50.

The plate 32 is in close association with the blade 42, the points 34 of the former extending beyond and close to the latter to protect it against sidewalks, curbings, and all manner of solid objects adjacent which it is necessary to trim the grass. The points 34 are able to get under low grass and lift it successively for severance by the blade 42 as the guard plate is turned by the grass. Since the plate 32 is freely rotatable and is turned by the grass and the like as the trimmer is moved along the edge of the walk, the guard points readily raise the grass and the like which is cut by the blade 42. The relative rotation of parts reduces clogging to a minimum, which is aided by the fact that the lower arm 22 is reduced in size to permit cuttings to fall to the ground from the points 34 which extend beyond the lower arm 22. The trimmer 10, of course, may be employed in the position of Figure 2, or it may be tilted in any direction for better cutting effect.

It is apparent that there has been provided a guard plate unit which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination with a lawn edge trimmer including a motor housing, a rotor shaft depending therefrom, and a rotary blade secured to said shaft, of a bracket secured to said motor housing including a lower arm beneath said blade, and a freely rotatable guard and grass lifting plate mounted in said lower arm underneath and extending beyond said rotary blade.

2. In combination with a lawn edge trimmer including a motor housing, a rotor shaft depending therefrom, and a rotary blade secured to said shaft, of a bracket secured to said motor housing including a lower arm beneath said blade, and a freely rotatable guard and grass lifting plate mounted in said lower arm underneath and extending beyond said rotary blade, said plate having radially projecting points extending beyond said blade for protection of the same and for feeding grass thereto.

3. In combination with a lawn edge trimmer including a motor housing, a rotor shaft depending therefrom, and a rotary blade secured to said shaft, of a bracket secured to said motor housing including a lower arm beneath said blade, an annular opening in said lower arm, a freely rotatable guard and grass lifting plate mounted in said opening underneath and extending beyond said rotary blade, and a disc member connected to and maintaining said plate against removal yet permitting rotary movement.

4. In combination with a lawn edge trimmer including a motor housing, a rotor shaft depending therefrom, and a rotary blade secured to said shaft, of a bracket secured to said motor housing including a lower arm beneath said blade, an annular opening in said lower arm, a freely rotatable guard and grass lifting plate mounted in said opening underneath and extending beyond said rotary blade, and a disc maintaining said plate against removal yet permitting rotary movement, said plate having radially projecting points extending beyond said blade for protection of the same and for feeding grass thereto.

5. In combination with a lawn edge trimmer including a motor housing, a rotor shaft depending therefrom, and a rotary blade secured to said shaft, of a bracket secured to said motor housing including a lower arm beneath said blade, and a freely rotatable guard and grass lifting plate mounted in said lower arm underneath and extending beyond said rotary blade, said plate having radially projecting points extending beyond said blade for protection of the same and for feeding grass thereto, said projecting points and said blade extending beyond said lower arm for the major portion thereof, thereby reducing clogging to a minimum.

6. In combination with a lawn edge trimmer including a motor housing, a rotor shaft depending from said motor housing, and a rotary blade secured to said shaft, of a bracket secured to said motor housing including a lower arm beneath said blade, and a guard and grass lifting plate mounted in said lower arm for free rotation, said plate having radially projecting points extending beyond said blade for protection of the same and for feeding grass thereto, said projecting points and said blade extending beyond said lower arm for the major portion thereof, thereby reducing clogging to a minimum, said lower arm including an opening having an undercut circumferential annular shoulder therebeneath, said guard and grass lifting plate including an annular flange resting in said opening, and a disc member disposed against said annular shoulder and secured to said plate maintaining said plate in rotative arrangement with said lower arm.

7. In combination with a lawn edge trimmer including a motor housing, a rotor shaft depending from said motor housing, and a rotary blade secured to said shaft, of a bracket secured to said motor housing including a lower arm beneath said blade, and a freely rotatable guard and grass lifting plate mounted in said lower arm extending beyond said lower arm for the major portion thereof, thereby reducing clogging to a minimum.

References Cited in the file of this patent

UNITED STATES PATENTS

| | | |
|---|---|---|
| Re. 21,289 | Orr | Dec. 5, 1939 |
| 1,794,178 | Karcher | Feb. 24, 1931 |
| 2,263,431 | White | Nov. 18, 1941 |
| 2,669,826 | Watrous | Feb. 23, 1954 |
| 2,832,184 | Beuerle | Apr. 29, 1958 |